(12) United States Patent
Oseen-Senda et al.

(10) Patent No.: US 12,456,847 B2
(45) Date of Patent: Oct. 28, 2025

(54) PROTECTED BUSBARS

(71) Applicant: Microsoft Technology Licensing, LLC, Redmond, WA (US)

(72) Inventors: Kathryn Oseen-Senda, Seattle, WA (US); Martha G. Peterson, Woodinville, WA (US); Dennis Trieu, Calgary (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 123 days.

(21) Appl. No.: 18/124,140

(22) Filed: Mar. 21, 2023

(65) Prior Publication Data
US 2024/0322507 A1    Sep. 26, 2024

(51) Int. Cl.
*H01R 25/16*    (2006.01)
*H02G 5/06*    (2006.01)

(52) U.S. Cl.
CPC ............. *H01R 25/161* (2013.01); *H02G 5/06* (2013.01)

(58) Field of Classification Search
None
See application file for complete search history.

(56) References Cited

U.S. PATENT DOCUMENTS 8,698,699 B2 * 4/2014 Saarela ................. H01R 24/58
                                                                343/906
9,099,813 B1 * 8/2015 Trout ................. H01R 13/6471

FOREIGN PATENT DOCUMENTS

DE          3510390 A  *  9/1986  .......... H01R 25/164
DE          3510390 A1     9/1986
WO      2010134105 A1    11/2010
WO   WO-2022152411 A1 *  7/2022  ............... H02G 5/10

OTHER PUBLICATIONS

International Search Report and Written Opinion received for PCT Application No. PCT/US2024/019309, Jul. 10, 2024, 15 pages.

* cited by examiner

*Primary Examiner* — Krystal Robinson
(74) *Attorney, Agent, or Firm* — Rainier Patents, P.S.

(57) ABSTRACT

The discussion relates to busbars that are protected from unintentional contact. One example includes a liquid immersion tank and a protected automatic busbar assembly positioned in the liquid immersion tank. The protected automatic busbar assembly can include a conductor and a deployable protector biased over the conductor. The example can include a computer that includes a device controller and an electrical connector. The device controller can be configured to overcome the bias and cause the deployable protector to transition away from the conductor to allow the conductor to be engaged by the electrical connector to couple the computer to the conductor of the protected automatic busbar assembly.

20 Claims, 10 Drawing Sheets

PROTECTED BUSBARS

BACKGROUND

Busbars are generally elongate structures that include linearly arranged conductors. Multiple electronic components can be positioned along the length of the busbar to be readily connected to, and disconnected from, the conductors.

SUMMARY

This patent relates to busbars and more particularly to protected automatic busbar assemblies. One example can include a busbar that includes a linear array of conductors and an array of deployable protectors positioned over the linear array of conductors. This example can also include an array of bus controllers. Individual bus controllers can be configured to bias individual deployable protectors to a protective position over individual conductors. The individual bus controllers can also be configured to transition the individual deployable protector to a stowed positioned when engaged by a computer without affecting positions of other deployable protectors of the array of deployable protectors.

This summary is intended to provide a quick introduction to some of the present concepts and is not intended to be limiting or all inclusive.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the figure and associated discussion where the reference number is first introduced.

DETAILED DESCRIPTION

The present concepts relate to busbars and specifically to protected automatic busbar assemblies. Busbars include linearly arranged conductors that provide an efficient mechanism for multiple electronic devices to be readily electrically connected and disconnected. However, with traditional busbars, unoccupied areas of the conductors are subject to being contacted by foreign objects, such as tools or debris. Such occurrences can cause electrical shorts that can damage the electronic devices. Alternatively or additionally, the foreign objects may physically lodge in the busbar and prevent electronic devices from being connected.

In contrast, the present concepts relate to protected automatic busbar assemblies. These protected automatic busbar assemblies provide a technical solution of protecting unoccupied portions of the busbar from foreign objects, yet automatically transition out of the way when an intended computing device approaches the busbar to allow the computing device to connect to the busbar. This technical solution is achieved without any additional effort or steps by the user. The user does not need to remember to move the protector out of the way before installing the computing device on the busbar or need to remember to move the protector back in to place when removing the computing device from the busbar.

Figure 1A:
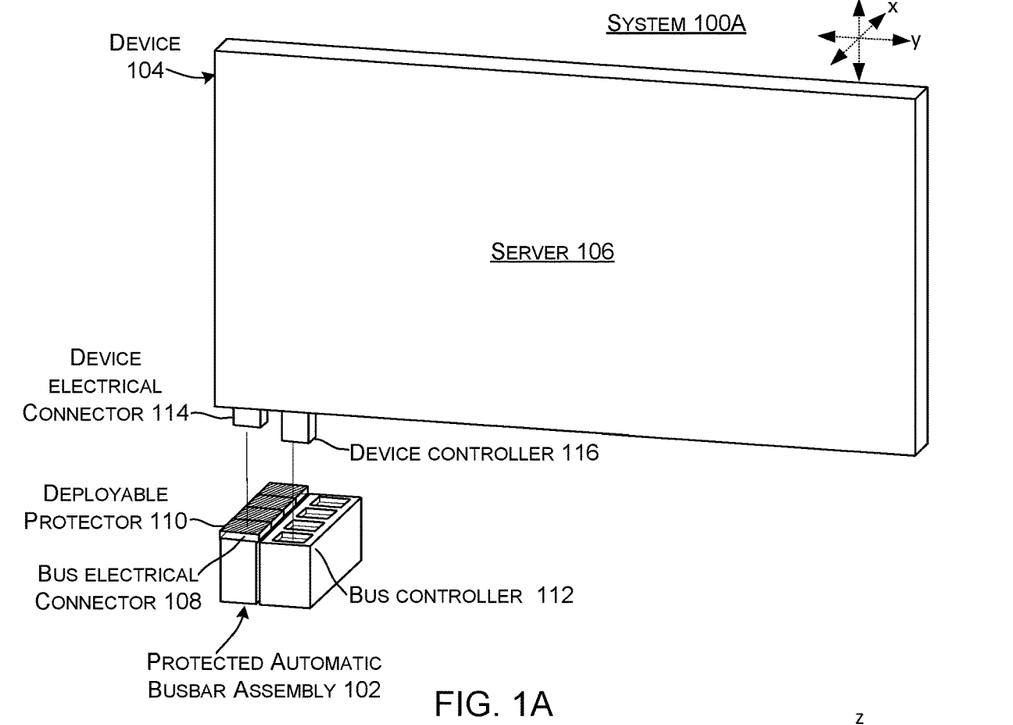
FIGS. 1A, 1B, and 2A-2C show perspective views of example protected automatic busbar assembly systems in accordance with some implementations of the present concepts.
Figure 1B:
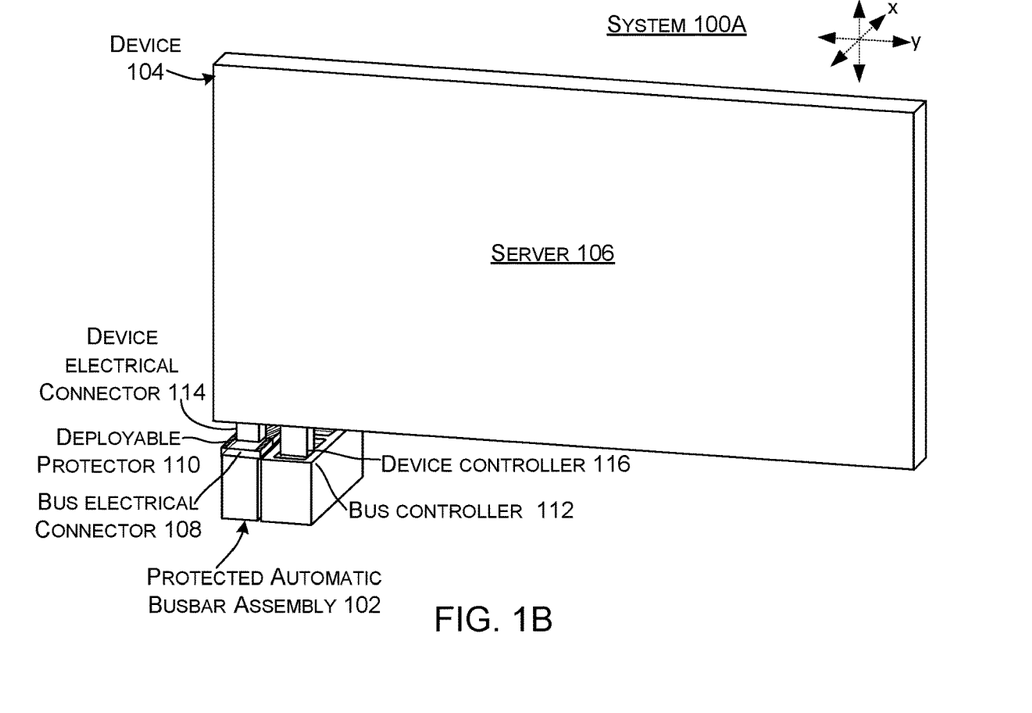

FIGS. 1A and 1B collectively show a system 100A in which the present protected automatic busbar concepts can be implemented. The system 100A includes a protected automatic busbar assembly 102 (hereinafter, 'busbar assembly'). Devices 104 such as servers 106 can be independently electrically connected and disconnected from the busbar assembly 102. For sake of brevity only one device 104 is shown in FIGS. 1A and 1B.

The busbar assembly 102 includes linearly arranged bus electrical connectors 108, deployable protectors 110, and bus controllers 112. The devices 104 include corresponding device electrical connectors 114 and device controllers 116. To avoid clutter, only one instance of each of these components is labelled on the drawing page.

As shown in FIG. 1A, in the absence of a device 104, the deployable protectors 110 cover or otherwise protect the bus electrical connectors 108 from contact by foreign objects, such as tools, keys, etc. This can be viewed as a 'protective position' of deployable protectors 110. As shown in FIG. 1B, as the device 104 is brought into proximity to the busbar assembly 102, the device controller 116 physically engages the bus controller 112. This engagement moves the deployable protector 110 to a 'stowed position.' The stowed position of the deployable protector 110 exposes the bus electrical connector 108 to the imminent physical engagement by the device electrical connector 114. Engagement of the bus electrical connector 108 and the device electrical connector 114 electrically connects the device 104 to the busbar assembly 102.

Note that the approach of an individual device 104 to the busbar assembly 102 transitions a corresponding individual deployable protector 110 from the protective position to the stowed position to allow engagement and electrical coupling between the individual device 104 and the individual bus electrical connector 108. However, this transition does not affect the position of other deployable protectors 110, which continue to protect the other bus electrical connectors 108. Thus, the present concepts provide a technical solution that not only provides physical protection to the busbar assembly, but also the protection is independently controlled for each 'spot' (e.g., bus electrical connector 108) on the busbar assembly.

Figure 2A:
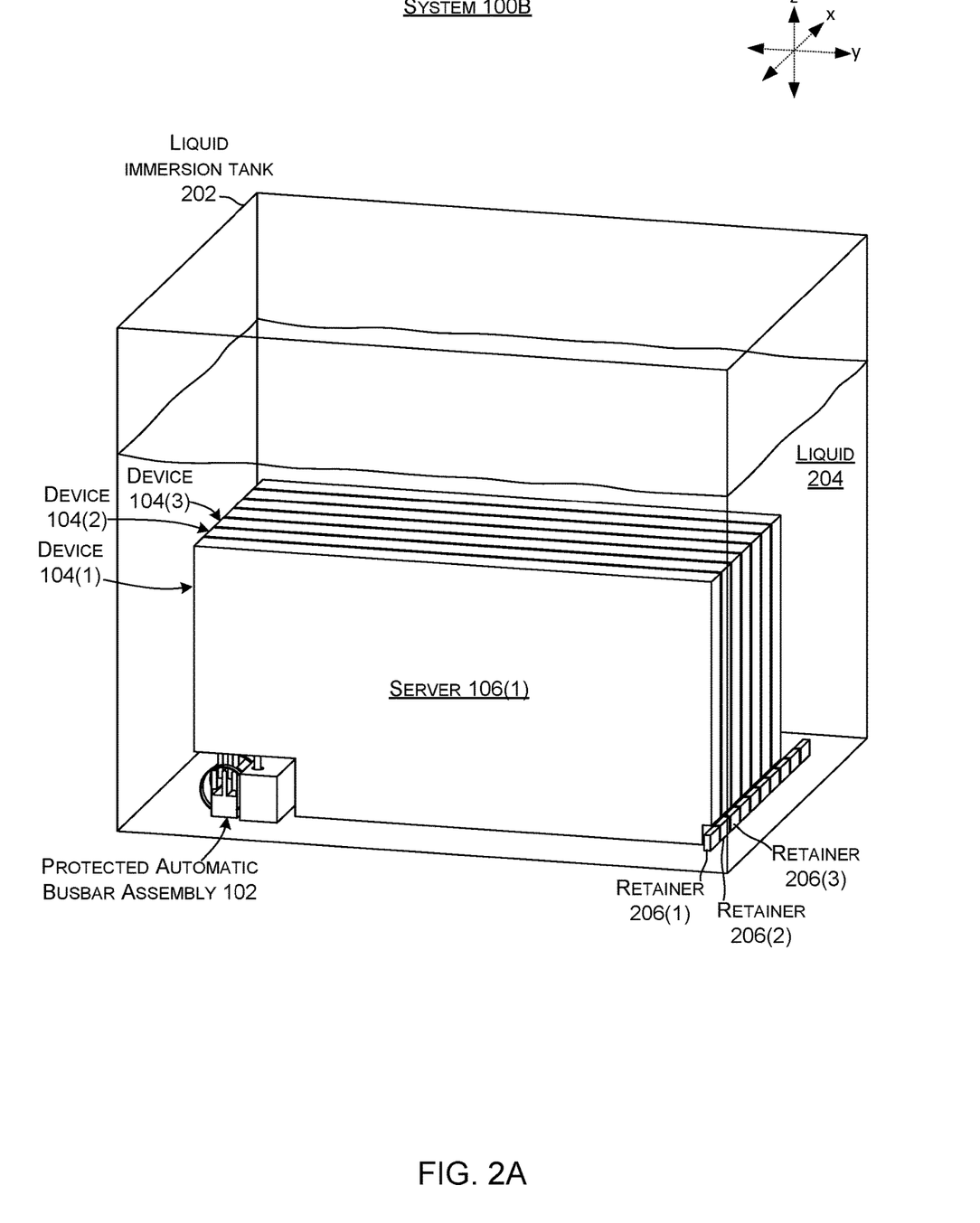

FIGS. 2A-3F collectively illustrate additional implementations of the present protected automatic busbar concepts relative to system 100B. (The use of suffixes 'A,' 'B,' etc. relative to system 100 is intended to convey that different systems may have different components and/or individual components may be different between systems). In this case, as shown in FIG. 2A, system 100B includes a liquid immersion tank 202 that contains a coolant liquid 204. Busbar assembly 102 is positioned in the coolant liquid 204. In this example, the busbar assembly 102 is positioned horizontally on the bottom of the liquid immersion tank 202 and extends in the x reference direction. Multiple devices 104, such as servers 106, can be readily installed and removably connected to the busbar assembly 102 in a side-by-side manner similar to books on a bookshelf. In this case, the servers 106 are physically secured between the busbar assembly 102 and opposing retainers 206. Note that in order to avoid clutter on the drawing page, not all instances of all components are labeled on FIG. 2A.

Figure 2B:
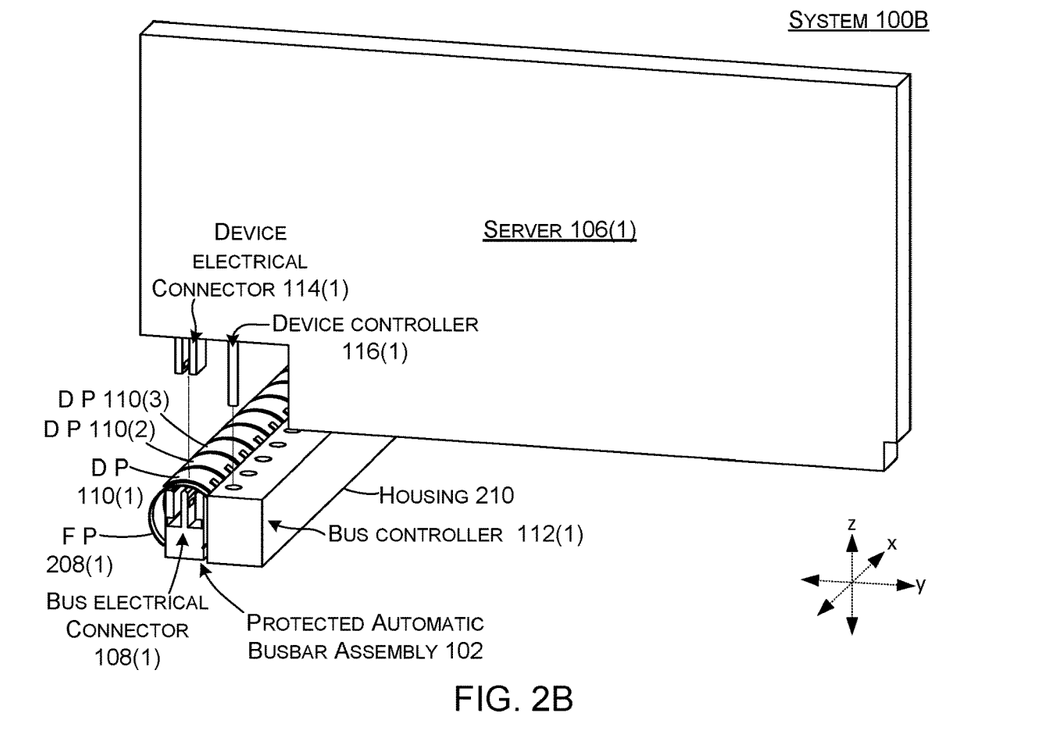

FIG. 2B shows a single server 106(1) in an uninstalled state relative to busbar assembly 102. The busbar assembly 102 includes multiple deployable protectors 110 separated by fixed protectors 208 that protect the busbar assembly from contact by foreign objects. To avoid clutter on the drawing page not all deployable protectors 110 and fixed protectors (FP) 208 are labelled. At this point, individual deployable protector 110(1) is positioned around (e.g., over) the busbar assembly 102 in a protective position or orientation to protect the busbar assembly from foreign objects.

At this point, the device electrical connector 114(1) and the device controller 116(1) are still spaced away from, and are not physically engaging, the bus electrical connector 108(1) and the bus controller 112(1). Note that the bus controller 112(1) is located in a housing 210 and is not readily visible, but is more readily visible in FIGS. 3A and 3B.

Figure 2C:
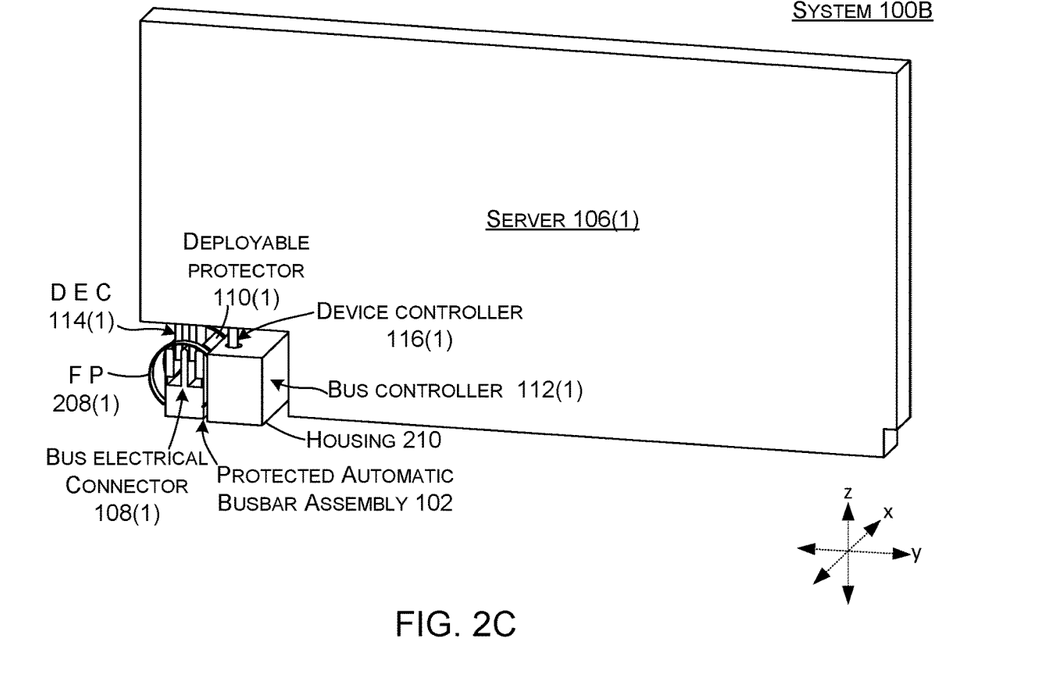

FIG. 2C shows deployable protector 110(1) transitioned to a stowed position and the server 106(1) installed on the busbar assembly 102. At this point, the device controller 116(1) is engaging bus controller 112(1). This engagement transitioned the deployable protector 110(1) from the protective position to the stowed position. With the deployable protector in the stowed position, the device electrical connector 114(1) can engage the bus electrical connector 108(1) to electrically connect the server 106(1) to the protected automatic busbar assembly 102. As mentioned above, the transition of one individual deployable protector, such as deployable protector 110(1) does not affect the position of the other deployable protectors 110. Also as mentioned above, this transition of the deployable protector 110(1) is automatic and does not require any extra action on the part of the user. These aspects are described in more detail below relative to FIGS. 3A-3F.

Note that in this implementation, the busbar assembly 102 is mounted horizontally on the bottom surface of the liquid immersion tank 202 with the conductors facing upwardly. This is an especially valuable application for at least two reasons. First, in this orientation, anything that falls into the liquid immersion tank is likely to settle on the busbar assembly and thus without the present protective aspects would likely cause problems, such as electrical shorting and/or physically obstructing the busbar. Second, access to the busbar in this immersed environment is difficult. Thus, the automatic deployment of the deployable protectors by the server from protective position to stowed position, and back to protective position, is especially valuable in this immersed environment. Note however, that the busbar assembly can be employed in any position and/or orientation. For instance, the busbar assembly could be mounted on a sidewall in either a horizontal or a vertical orientation, among others.

Figure 3A:
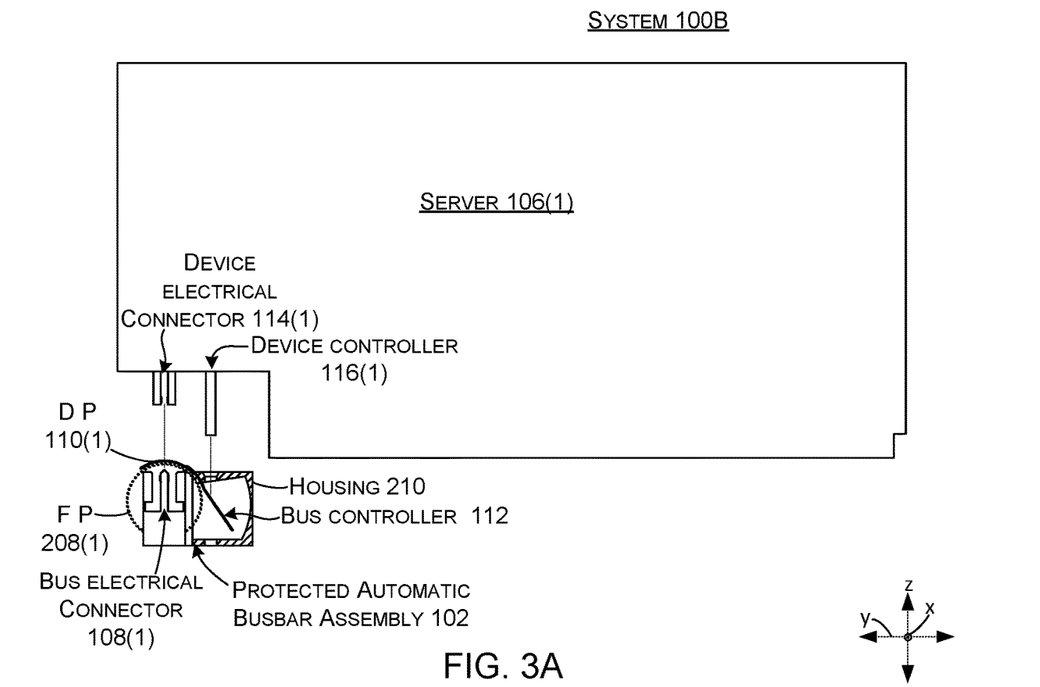
FIGS. 3A-3F, 4, 5, 6A, and 6B show elevational views of protected automatic busbar assembly systems in accordance with some implementations of the present concepts.
Figure 3B:
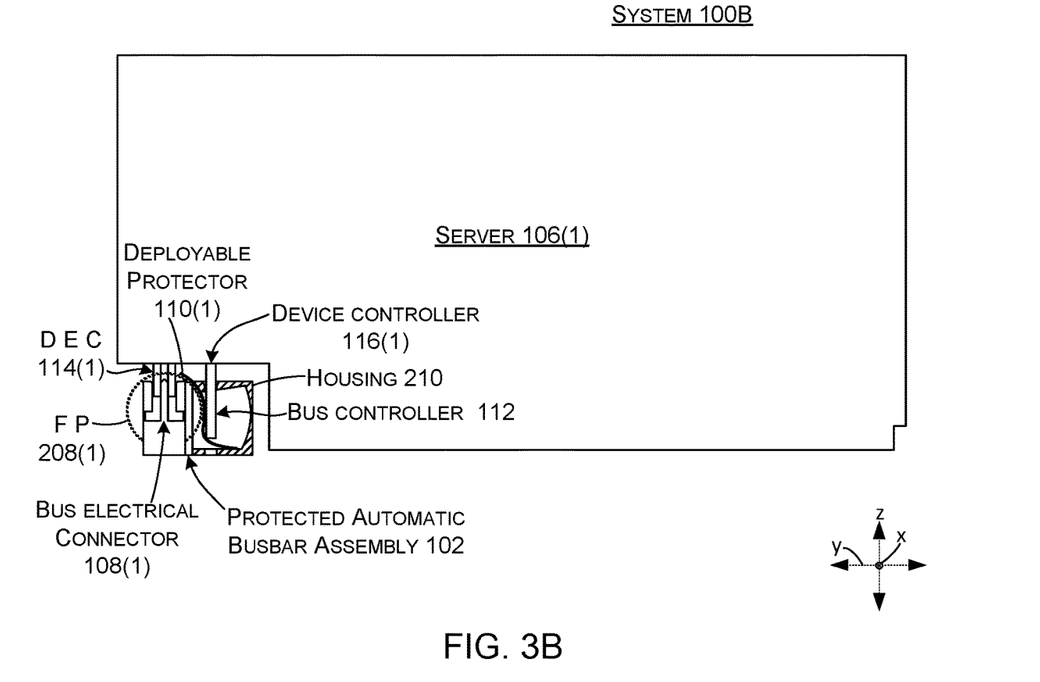
Figure 3C:
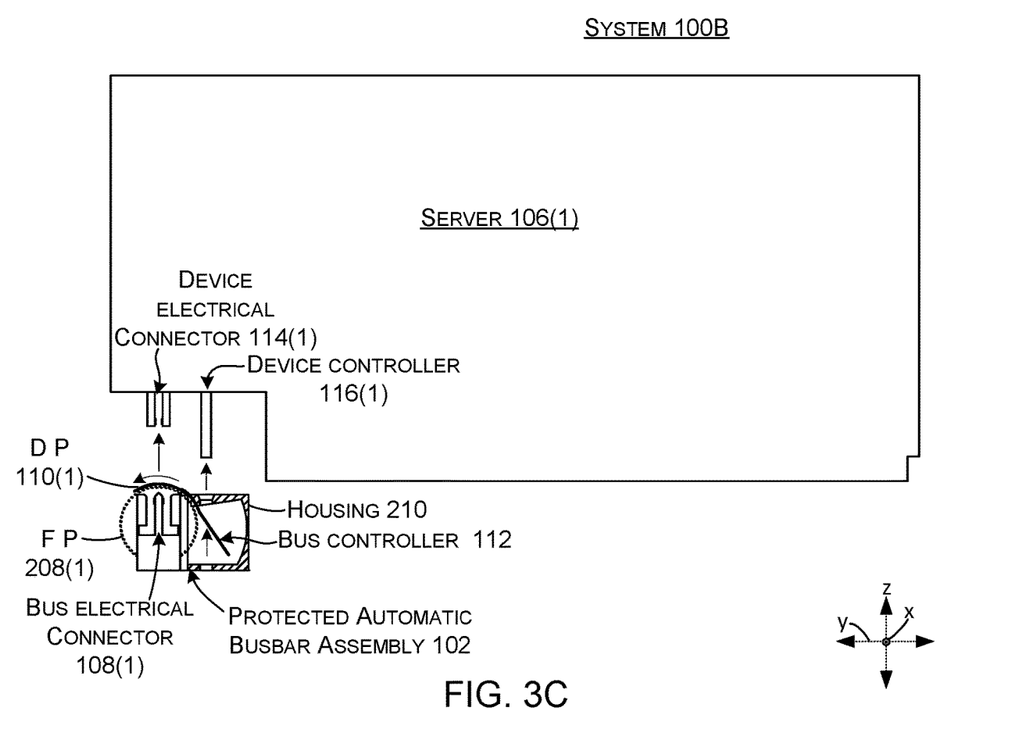
Figure 3D:
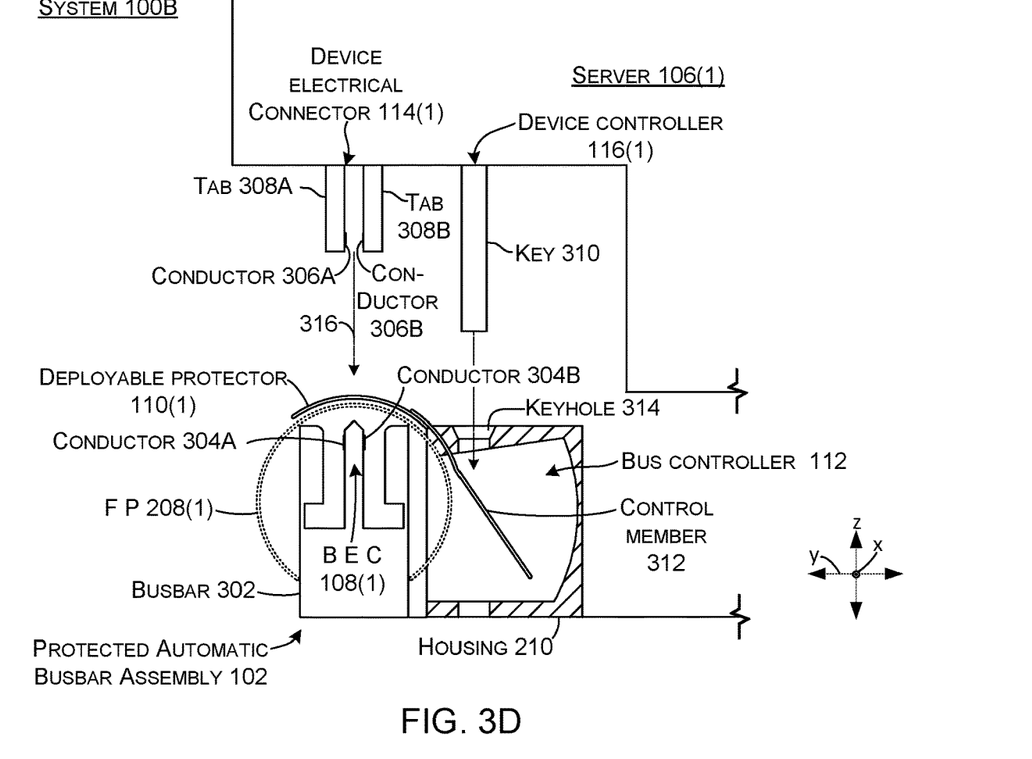
Figure 3E:
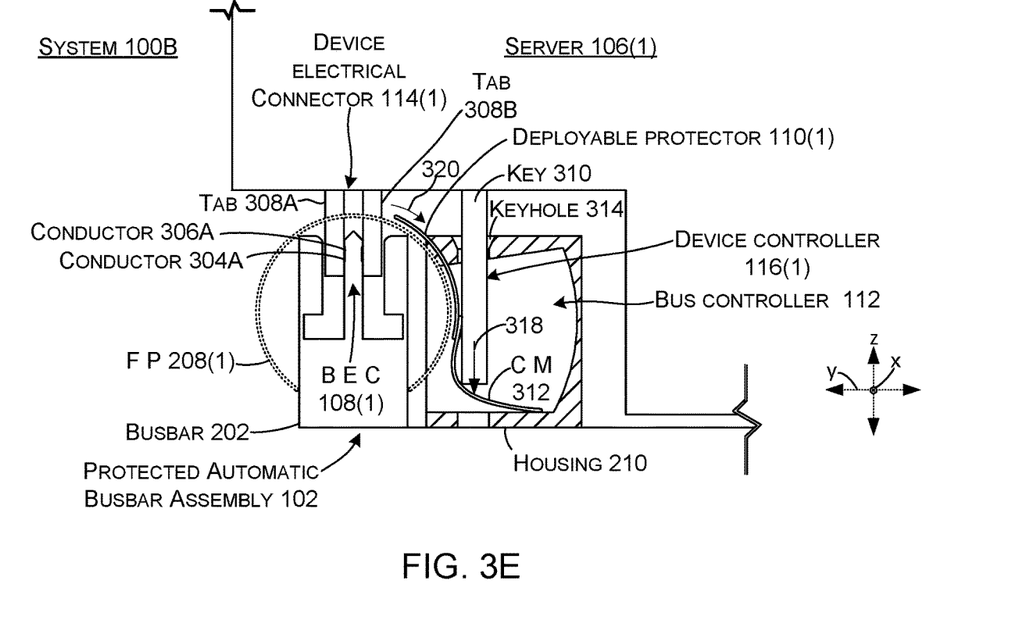
Figure 3F:
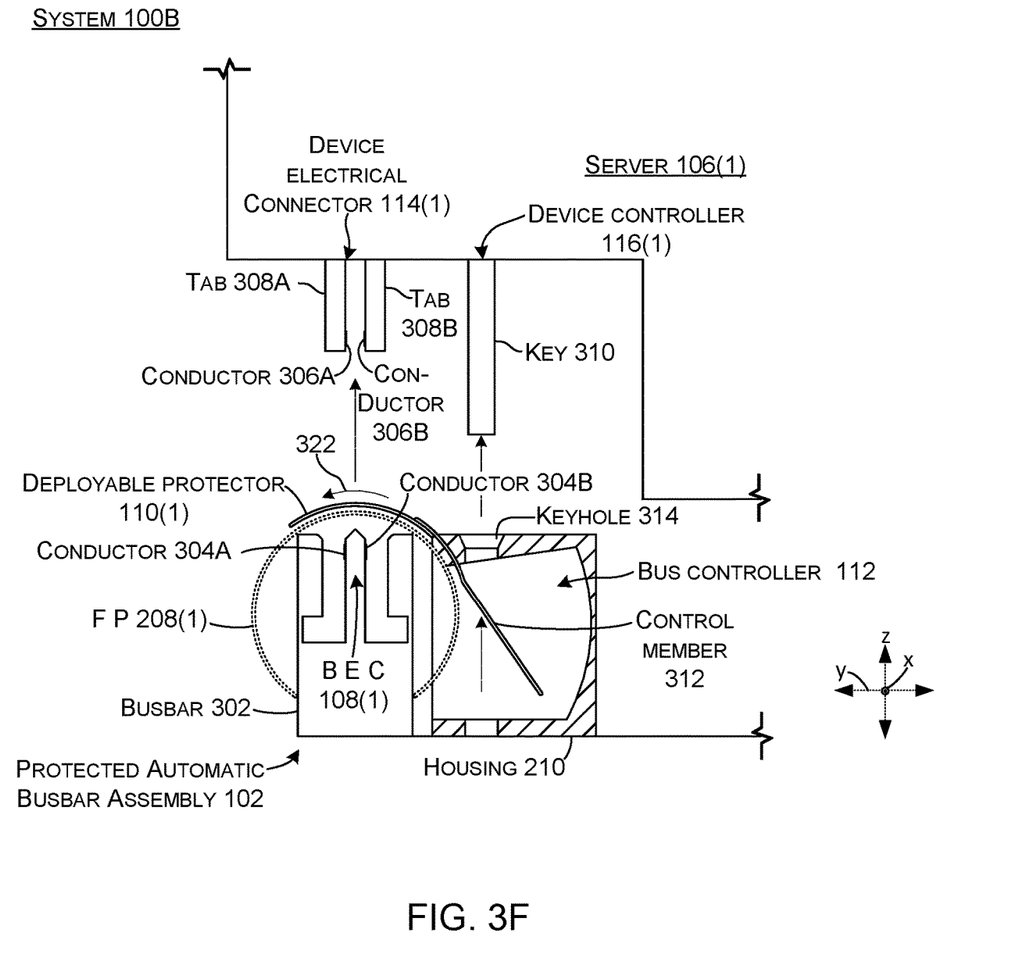

FIGS. 3A-3F collectively illustrate further details of example busbar assembly 102 as implemented in system 100B introduced in FIGS. 2A-2C. FIGS. 3A and 3B show server 106(1) in an uninstalled state and installed state, respectively, relative to the busbar assembly 102. FIG. 3C shows the server once again removed from the busbar assembly 102. FIGS. 3D, 3E, and 3F are similar to FIGS. 3A, 3B, and 3C respectively, but are zoomed in on the busbar assembly 102 to show a greater level of detail.

In this implementation the busbar assembly 102 also includes a busbar 302 that includes a line of conductors 304 extending in the x reference direction (e.g., into and out of the drawing page). Individual pairs of conductors 304A and 304B (FIG. 3D) are associated with individual bus electrical connectors 108. Similarly, device electrical connectors 114 include conductors 306 positioned on tabs 308 (FIG. 3D).

In this case, the server's device controller 116(1) includes a key 310. The busbar assembly's bus controller 112 includes a control member 312 positioned in the housing 210. The housing 210 also defines a keyhole 314. The housing 210 shrouds control member 312 and thus the housing serves to block physical access to the control member 312 except through the keyhole 314.

Beginning at the uninstalled state of FIGS. 3A and 3D, the server 106(1) can be moved toward the busbar assembly 102 as indicated by arrows 316. At this point, the deployable protector 110(1) is biased into the protective position by the control member 312. As the server 106(1) is moved toward the busbar assembly 102, the key 310 passes through the keyhole 314 and contacts the control member 312. Downward pressure of the key 310 on the control member 312 will cause the control member 312 to deflect and move the deployable protector 110(1) out of the way (e.g., to the stowed position of FIGS. 3B and 3E) as the device electrical connector 114 approaches the bus electrical connector 108 (1).

The keyhole 314 has a cross-sectional shape and size that corresponds to a cross-sectional shape and size (as measured in the xy plane) of the key 310. For instance, the keyhole 314 and the key 310 can both be circular, rectangular, or star-shaped, among others. Other objects, such as foreign objects with different shapes are unlikely to fit through the keyhole 314. Further, after fitting through the keyhole 314, the key 310 has to extend far enough into the housing 210 to engage the control member 312. Thus, the key 310 has a specific shape, size, and length to pass through the keyhole 314 and reach the control member 312. Foreign objects that fall onto the busbar assembly are extremely unlikely to have these properties and this orientation.

Once the key 310 reaches the control member 312, the key can impart a force on the control member 312. The force on the control member 312 will move (e.g., transition) the deployable protector 110(1) from the protective position (FIGS. 3A and 3D) to the stowed position (FIGS. 3B and 3E). In this case, as shown on FIGS. 3B and 3D, downward force from the key 310 bends the control member 312 downward. One end of the control member 312 is fixed to the housing 210. An opposite second end is connected to the deployable protector 110(1). The bending of the control member 312 by the key 310 causes the control member 312 to impart a force on the deployable protector 110(1) as indicated by arrow 318 on FIG. 3E. The force overcomes the bias of the control member 312 and causes the deployable protector to rotate clockwise as indicated by arrow 320 on FIG. 3E. In this case, the deployable protector 110(1) rides on the adjacent fixed protectors 208 and slides from the protective position to the stowed position and back to the protective position on the adjacent fixed protectors 208.

Physical engagement of the bus electrical connector 108 with device electrical connector 114 causes conductors 304 to electrically contact conductors 306 to electrically connect the server 106(1) to the busbar assembly 102.

As shown in FIGS. 3C and 3F, when the server 106(1) is removed from the busbar assembly 102 (e.g., lifted upwardly in the z reference direction), the bias of the control member 312 rotates the deployable protector 110(1) counterclockwise back into the protective position as indicated by arrow 322 on FIG. 3F. Thus, no special additional action was required to install the server on the busbar assembly 102 compared to a traditional scenario and no additional action was required when the server was removed. Yet, the busbar assembly is protected from inadvertent contact prior to and after engagement by the server.

Figure 4:
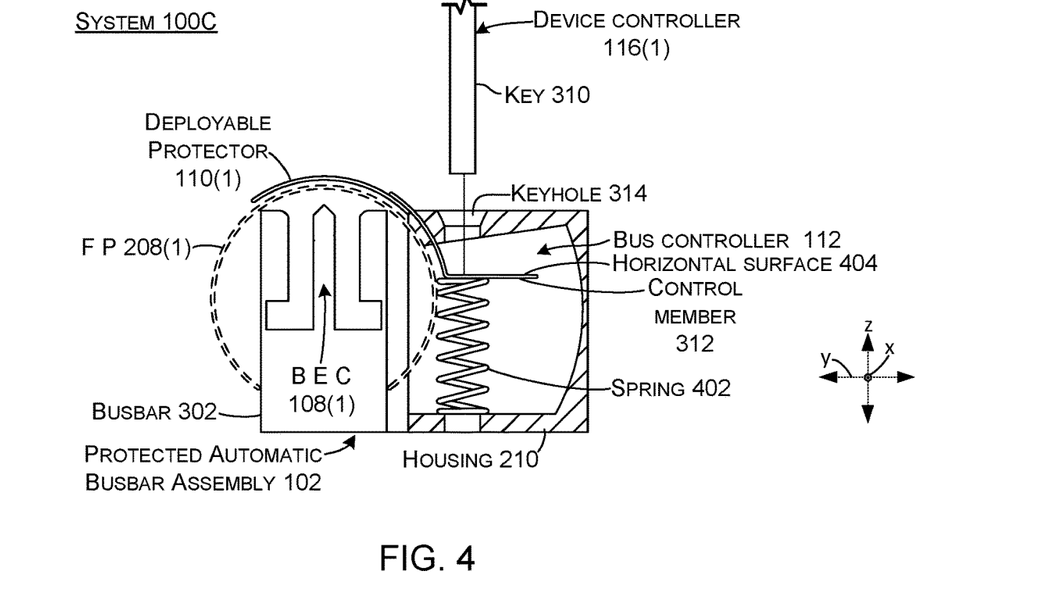

FIG. 4 shows another system 100C. The busbar assembly 102 includes bus controller 112. In this case, the bus controller's control member 312 operates cooperatively with a biasing element, such as a spring 402. The spring 402 is captured between the housing 210 and the control member 312. The spring 402 biases the control member 312 upward in the positive z reference direction. The control member 312 maintains the deployable protector 110(1) in the protective position over the bus electrical connector 108. In this illustration, the server is represented by the device controller 116(1) in the form of key 310. As the server approaches the busbar assembly 102 in the negative z reference direction, the key 310 can pass through the keyhole 314 and engage a horizontal surface 404 of the control member 312. The key 310 can move downward and move the horizontal surface 404 in the negative z reference direction. In turn, the control member 312 overcomes the bias of the spring 402 and compresses the spring. The control member simultaneously pulls the deployable protector 110(1) clockwise into the stowed position to expose the bus electrical connector 108(1) to connect the server to the bus bar assembly. If the server is subsequently removed, withdrawal of the key 310 allows the spring 402 to once again bias the control member 312 upwardly. In turn, the control member 312 rotates the deployable protector 110(1) counter-clockwise back into the protective position.

Figure 5:
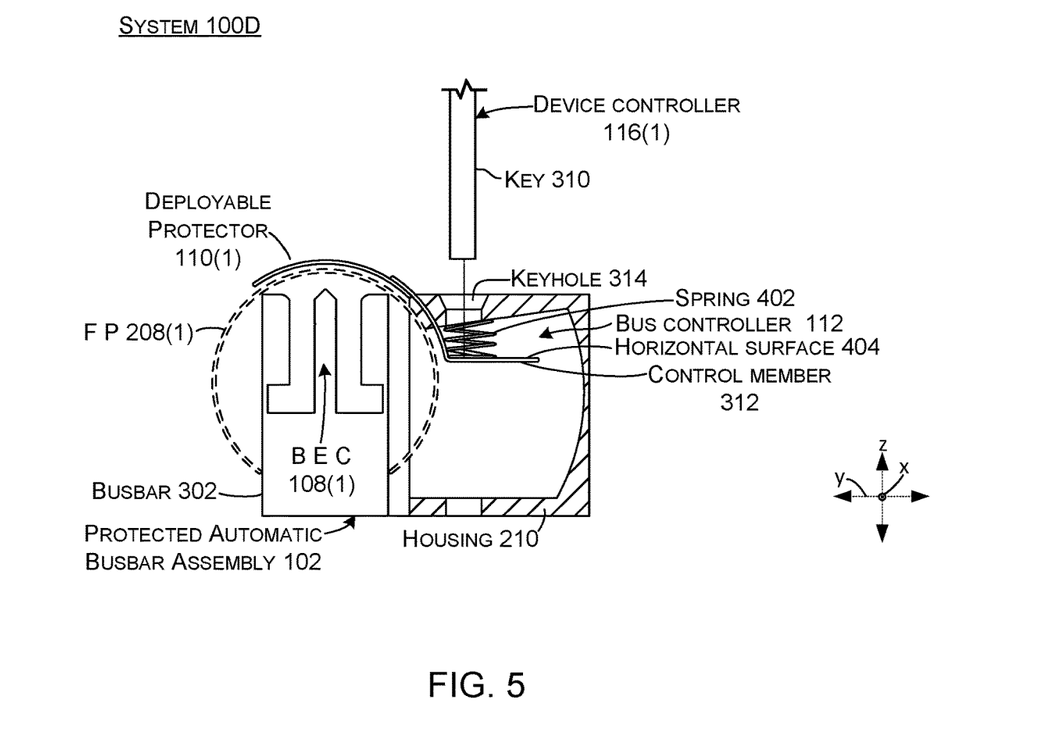

FIG. 5 shows another system 100D that is similar to system 100C of FIG. 4. In this case, the spring 402 is co-incident with the keyhole 314. The spring 402 is captured between the control member 312 and the housing 210 and above the control member. The spring 402 biases the control member 312 upward in the positive z reference direction. The control member 312 maintains the deployable protector 110(1) in the protective position over the bus electrical connector 108. In this illustration, the server is represented by the device controller 116(1) in the form of key 310. As the server approaches the busbar assembly 102, the key 310 can pass through the keyhole 314 and the spring 402 and engage horizontal surface 404 of the control member 312. The key 310 can move downward and move the horizontal surface 404 in the z reference direction. In turn, the control member 312 overcomes the bias of the spring 402 and stretches the spring. The control member 312 simultaneously pulls the deployable protector 110(1) clockwise into the stowed position to expose the bus electrical connector 108(1) to connect the server to the busbar assembly 102. If the server is subsequently removed, withdrawal of the key 310 allows the spring 402 to contract and once again bias the control member 312 upwardly. In turn, the control member 312 rotates the deployable protector 110(1) counter-clockwise back into the protective position.

Figure 6A:
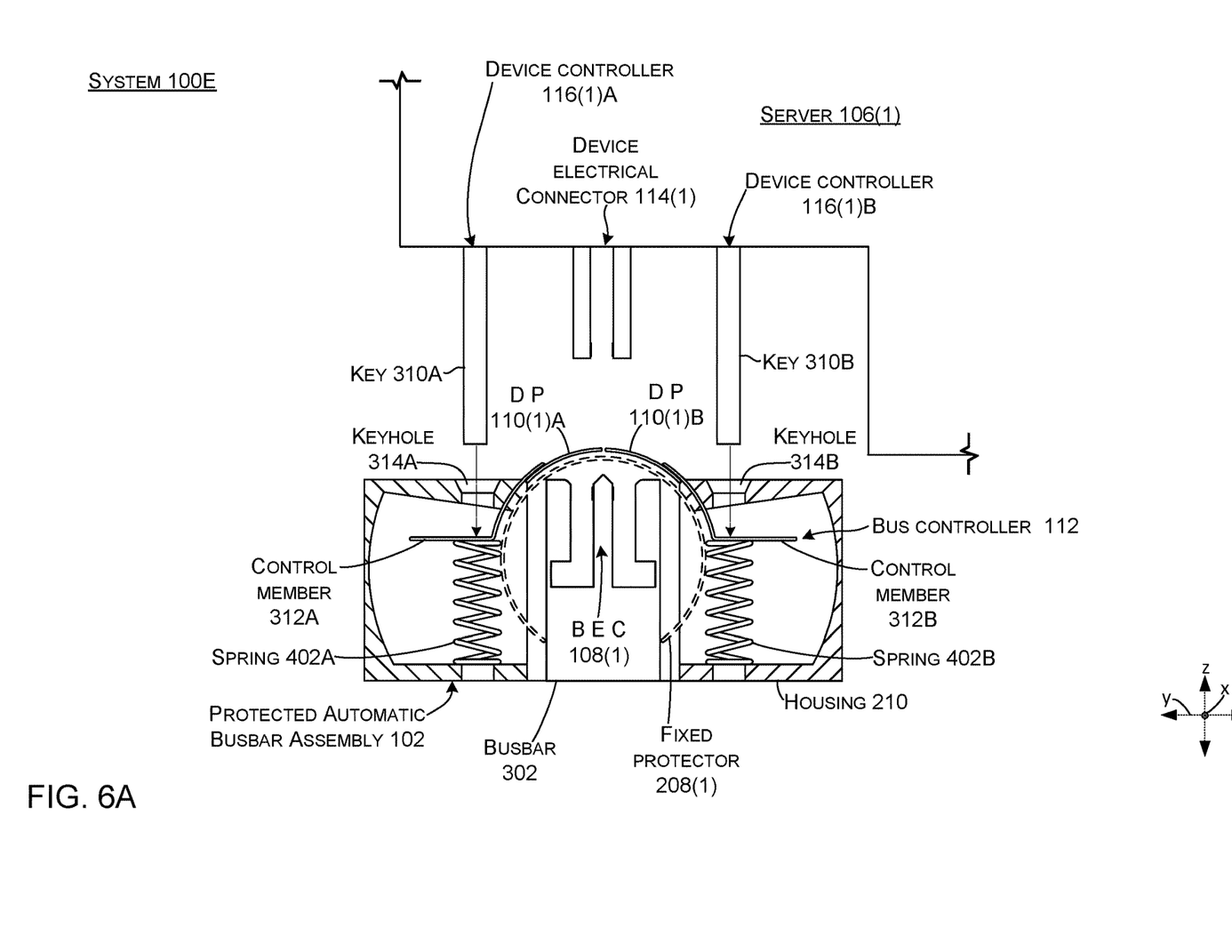
Figure 6B:
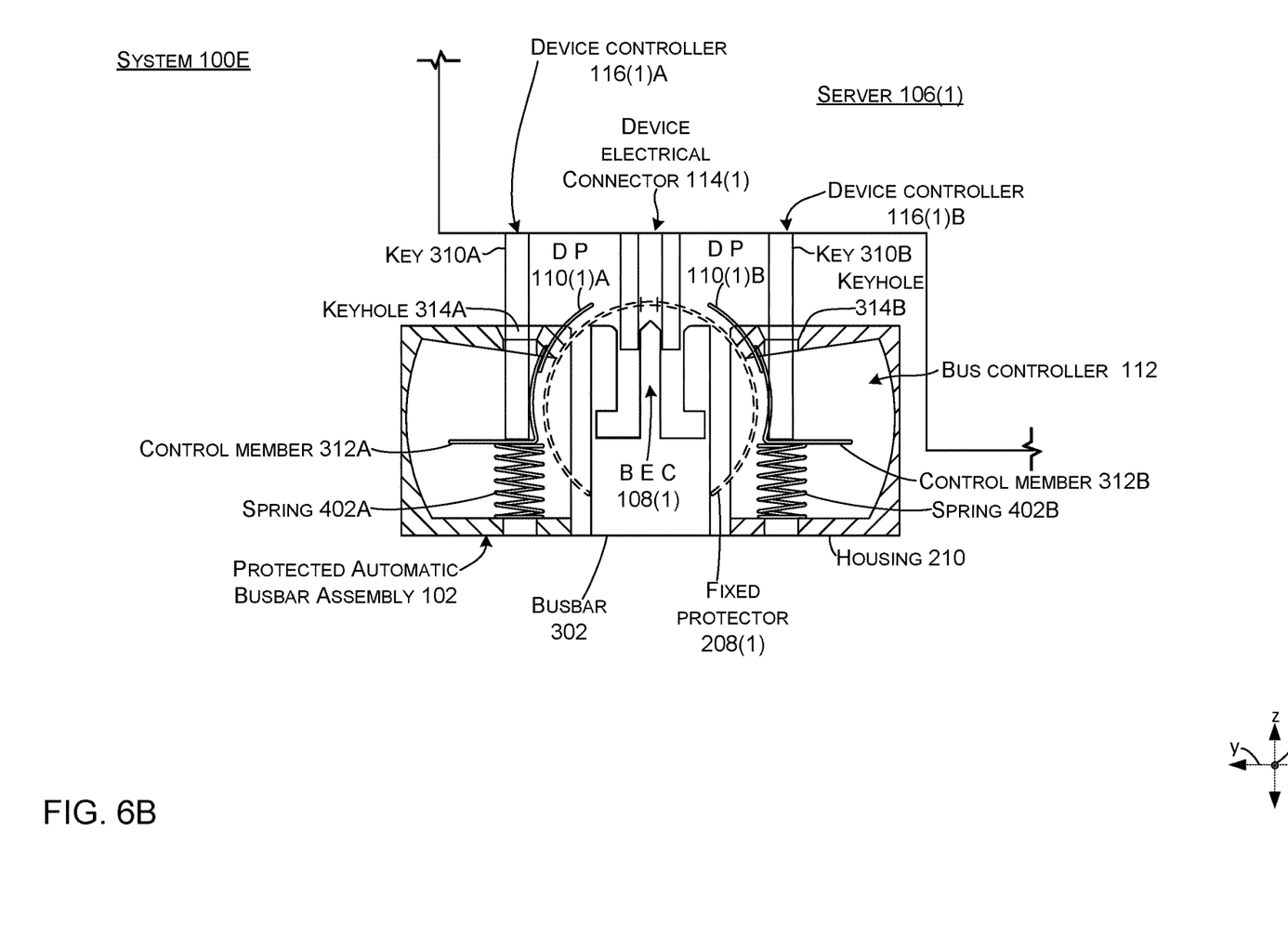

FIGS. 6A and 6B collectively show another system 100E that employs opposing deployable protectors 110(1)A and 110(1)B. This system also includes device controller 116(1) that entails two keys 310A and 310B. Keys 310A and 310B are positioned on opposite sides of the device electrical connector 114(1). FIG. 6A shows the deployable protectors 110(1)A and 110(2)B in the protective position and the server 106(1) is not installed on the busbar assembly 102. FIG. 6B shows the deployable protectors 110(1)A and 110(2)B in the stowed position and the server 106(1) installed on the busbar assembly 102.

In this implementation, as shown in FIG. 6A, the control members 312A and 312B are biased upwards by springs 402A and 402B. In turn, the control members 312A and 312B act upon deployable protectors 110(1)A and 110(1)B, respectively to maintain the deployable protectors in the protective position, in a similar manner to the implementation described above relative to FIG. 4.

To electrically connect the server 106(1) to the busbar 302, the server is moved downwardly in the z reference direction. The keys 310A and 310B enter keyholes 314A and 314B, respectively. The keys 310A and 310B then engage the bus controller's control members 312A and 312B, respectively. The keys 310A and 310B overcome the bias of springs 402A and 402B, respectively, and force the control members 312A and 312B down and compress the springs 402A and 402B. The downward movement of control members 312A and 312B rotate the deployable protectors 110(1)A and 110(1)B, respectively, from the protective position of FIG. 6A to the stowed position of FIG. 6B. Specifically, control member 312A rotates deployable protector 110(1)A counterclockwise from the protective position toward the stowed position and control member 312B rotates deployable protector 110(1)B clockwise from the protective position toward the stowed position. This allows the device electrical connector 114(1) to approach and engage the busbar electrical connector 108(1) to electrically connect the server 106(1) to the busbar 302. Note that the electrical connection is achieved via contact between the conductors of the device electrical connector 114(1) and the conductors of the busbar electrical connector 108(1), which are shown in FIGS. 6A and 6B, but which are not labelled to avoid clutter on the drawing page. These elements are discussed with specificity and labelled relative to FIGS. 3D-3F.

When the server 106(1) is removed from the busbar assembly 102, the bias from the springs 402A and 402B once again biases the control members 312A and 312B, respectively upward. Specifically, spring 402A biases control member 312A and hence deployable protector 110(1)A upwards in a clockwise direction and spring 402B biases control member 312B and deployable protector 110(1)B upwards in a counterclockwise direction. The bias rotates the deployable protectors 110(1)A and 110(1)B back into the protective position. The protective position reduces and potentially eliminates chances of inadvertent contact of foreign objects with the busbar 302.

The present concepts provide a technical solution of protecting a busbar from unintended contact. The technical solution is achieved without any manual action. The busbar is protected except when engaged by a target device, such as a server. The engagement automatically causes the individual busbar protector to move out of the way so that the target device can electrically connect to the busbar. Upon subsequent removal of the target device, the busbar is once again automatically protected without any user action.

Various examples are described above. Additional examples are described below. One example includes a system comprising a liquid immersion tank and a protected automatic busbar assembly positioned in the liquid immersion tank, the protected automatic busbar assembly comprising a conductor and a deployable protector positioned over the conductor and configured to automatically transition away from the conductor where a computing device is positioned on the protected automatic busbar assembly to contact the conductor.

Another example can include any of the above and/or below examples where the protected automatic busbar assembly is positioned horizontally on a bottom surface of the liquid immersion tank.

Another example can include any of the above and/or below examples where the protected automatic busbar assembly comprises multiple linearly arranged conductors and multiple deployable protectors positioned over individual conductors.

Another example can include any of the above and/or below examples where the computing device includes a device controller that comprises a key.

Another example can include any of the above and/or below examples where the individual deployable protector includes a control member that is configured to be engaged by the key.

Another example can include any of the above and/or below examples where the engagement of the key on the control member is configured to move the deployable protector from a protective position to a stowed position.

Another example can include any of the above and/or below examples where the control member is configured to bias the deployable protector toward the protective position unless engaged by the key.

Another example can include any of the above and/or below examples where the system further comprises a biasing element that biases the control member toward the protective position.

Another example can include any of the above and/or below examples where the control member is positioned in a housing and wherein access to the control member is limited to a keyhole defined in the housing.

Another example can include any of the above and/or below examples where a shape and size of the keyhole corresponds to a shape and size of the key.

Another example includes a system comprising a liquid immersion tank, a protected automatic busbar assembly positioned in the liquid immersion tank, the protected automatic busbar assembly comprising a conductor and a deployable protector biased over the conductor and a computing device that includes a device controller and an electrical connector, the device controller configured to overcome the bias and cause the deployable protector to transition away from the conductor to allow the conductor to be engaged by the electrical connector to couple the computing device to the conductor.

Another example can include any of the above and/or below examples where the device controller comprises a key.

Another example can include any of the above and/or below examples where the protected automatic busbar assembly defines a keyhole having a cross-sectional shape that corresponds to a cross-sectional shape of the key.

Another example can include any of the above and/or below examples where the deployable protector is controlled by a bus controller.

Another example can include any of the above and/or below examples where engagement of the bus controller by the key transitions the deployable protector from a protective position to a stowed position.

Another example includes a device comprising a busbar comprising a linear array of conductors, an array of deployable protectors positioned over the linear array of conductors and an array of bus controllers, individual bus controllers configured to bias individual deployable protectors to a protective position over individual conductors and configured to transition the individual deployable protector to a stowed positioned when engaged by a computing device without affecting positions of other deployable protectors of the array of deployable protectors.

Another example can include any of the above and/or below examples where the individual bus controller comprises a housing that shrouds a control member.

Another example can include any of the above and/or below examples where the control member biases the individual deployable protectors toward the protective position.

Another example can include any of the above and/or below examples where the housing includes a keyhole and blocks access to the control member except through the keyhole.

Another example can include any of the above and/or below examples where a shape of the keyhole matches a shape of a key on the computing device.

CONCLUSION

Although the subject matter relating to protected automatic busbar assemblies has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device, comprising:
a busbar comprising a linear array of conductors;
an array of deployable protectors positioned over the linear array of conductors; and,
an array of bus controllers, individual bus controllers configured to bias individual deployable protectors to a protective position over individual conductors and configured to transition the individual deployable protectors to a stowed positioned when engaged by a computing device without affecting positions of other deployable protectors of the array of deployable protectors.

2. The device of claim 1, wherein the individual bus controllers comprise a housing that shrouds a control member.

3. The device of claim 2, wherein the control member biases the individual deployable protectors toward the protective position.

4. The device of claim 3, wherein the housing includes a keyhole and blocks access to the control member except through the keyhole.

5. The device of claim 4, wherein a shape of the keyhole matches a shape of a key on the computing device.

6. A system, comprising:
a busbar comprising two generally parallel elongate conductors; and,
multiple deployable protectors linearly arranged along the busbar, individual deployable protectors configured to automatically transition from a protective position that obscures the two generally parallel elongate conductors to a stowed position by a computing device that is positioned in electrical contact with the two generally parallel elongate conductors without affecting positions of other of the multiple deployable protectors.

7. The system of claim 6, wherein the individual deployable protectors are configured to interact with a fixed portion in the protective position and to move away from the fixed portion in the stowed position.

8. The system of claim 7, wherein the individual deployable protectors are configured to move away from the fixed portion by rotating relative to the fixed portion.

9. The system of claim 8, wherein the computing device includes a device controller that comprises a key.

10. The system of claim 9, wherein the individual deployable protectors include a control member that is configured to be engaged by the key of the computing device.

11. The system of claim 10, wherein the engagement of the key on the control member is configured to move the individual deployable protectors from the protective position to the stowed position.

12. The system of claim 11, wherein the control member is configured to bias the individual deployable protectors toward the protective position unless engaged by the key.

13. The system of claim 12, further comprising a biasing element that biases the control member toward the protective position.

14. The system of claim 13, wherein the biasing element comprises a spring.

15. The system of claim 14, wherein the individual deployable protectors comprise a pair of opposing deployable protectors that overlap in the protective position and are spaced apart in the stowed position.

16. A system, comprising:
a protected automatic busbar assembly comprising a conductor and an array of deployable protectors linearly arranged along the conductor and biased to protective positions around the conductor; and,
a computing device that includes a device controller and an electrical connector, the device controller configured to overcome the bias of an individual deployable protector and cause the individual deployable protector to transition to a stowed position to allow the conductor to be engaged by the electrical connector to couple the computing device to the conductor of the protected automatic busbar assembly.

17. The system of claim 16, wherein the protected automatic busbar assembly comprises a bus controller and wherein contact of the device controller with the bus controller is configured to overcome the bias to transition the individual deployable protector to the stowed position.

18. The system of claim 17, wherein the bus controller is configured to convert linear movement of the device controller to rotational movement of the individual deployable protector.

19. The system of claim 18, wherein the bus controller comprises a control member coupled between a spring and the individual deployable protector, wherein the control member is configured to engage the device controller to overcome bias from the spring to transition the individual deployable protector from the protective position to the stowed position.

20. The system of claim 17, wherein the individual deployable protector is configured to rotate to the stowed position.

* * * * *